Jan. 16, 1951     E. G. BODEN     2,538,229
BEARING MOUNTING
Filed May 20, 1948     2 Sheets-Sheet 1
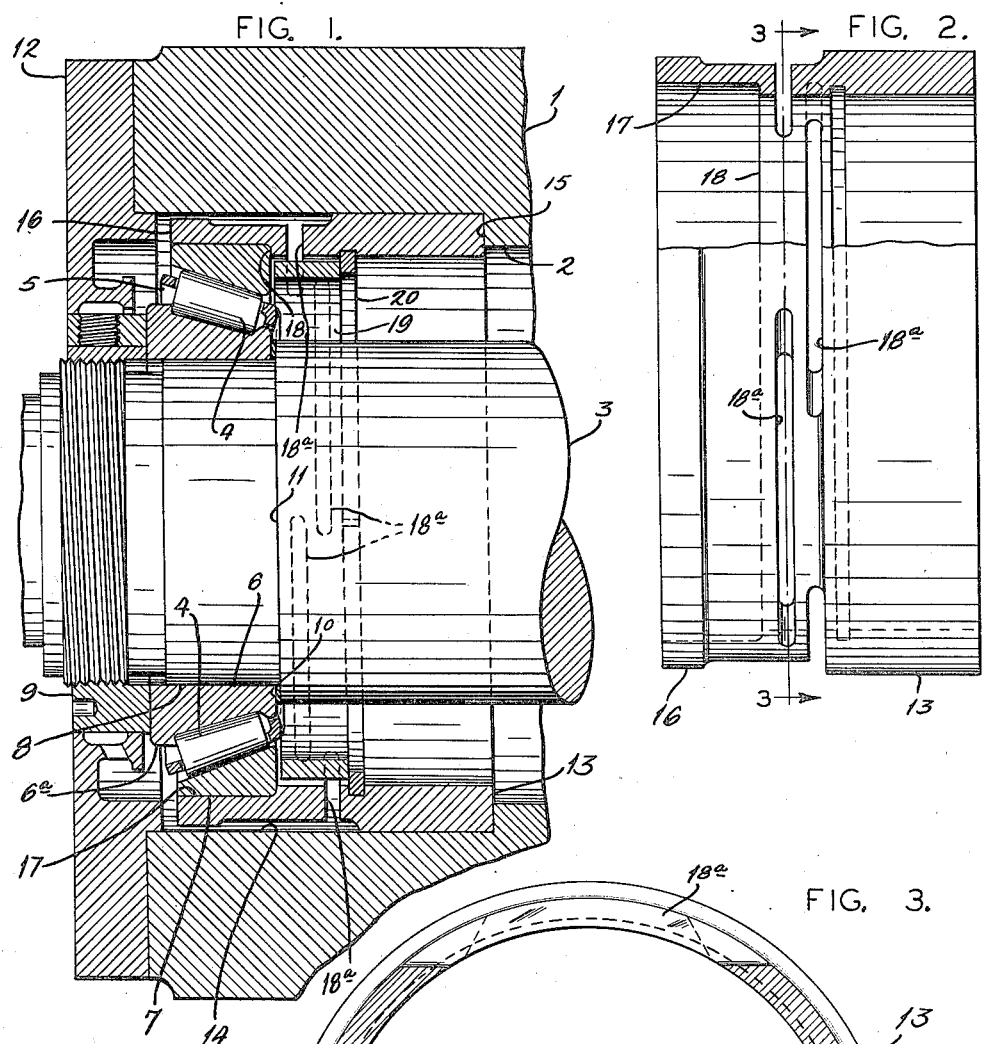
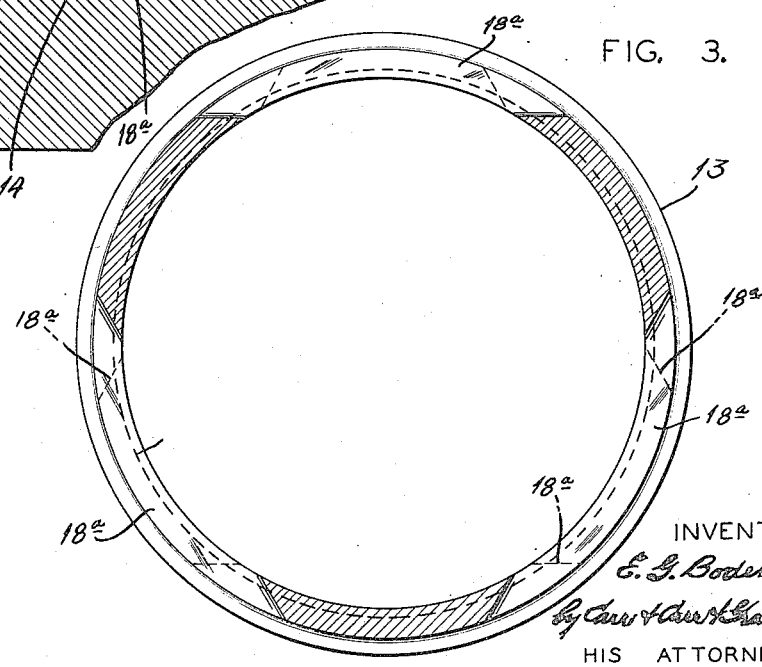
INVENTOR:
E. G. Boden,
By Carr & Curtis Gravely,
HIS ATTORNEYS.

Jan. 16, 1951 E. G. BODEN 2,538,229
BEARING MOUNTING
Filed May 20, 1948 2 Sheets-Sheet 2
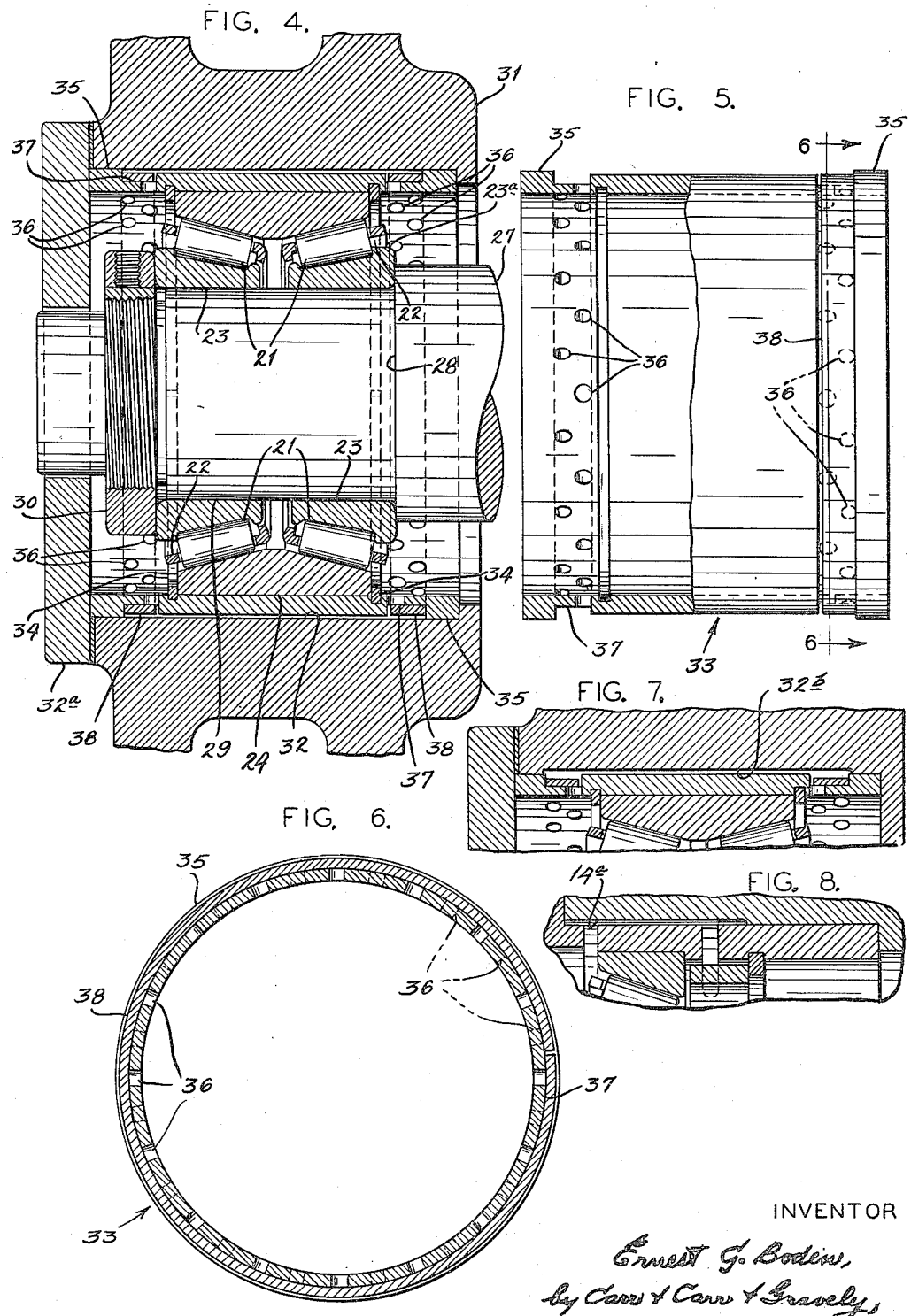
INVENTOR
Ernest G. Boden,
by Carr & Carr & Gravely,
HIS ATTORNEYS Patented Jan. 16, 1951

2,538,229

UNITED STATES PATENT OFFICE 2,538,229

BEARING MOUNTING

Ernest G. Boden, Canton, Ohio, assignor to The
Timken Roller Bearing Company, Canton, Ohio,
a corporation of Ohio Application May 20, 1948, Serial No. 28,110

14 Claims. (Cl. 308—184)

1

This invention relates to mountings for rotary antifriction bearings, particularly taper roller bearings which operate at high speeds and are liable to fail due to overload caused by high temperature rises resulting from such high rotational speeds.

The principal object of the present invention is to devise a simple and economical mounting for high speed bearings of the above type that will accommodate such radial expansion of the bearing and the resultant axial movement of the outer raceway member when the thrust load on the bearing reaches the maximum capacity for the speed for which the bearing is designed. Another object is to prevent stressing of the bearing mounting beyond its elastic limit during the operation of the bearing and during the assembly and disassembly of the bearing mounting.

The invention consists principally in providing a bearing mounting sleeve having one end portion rigidly mounted and the other end portion free and constituting a seat for the cup or outer raceway member of the bearing, and a resilient intermediate portion adapted to accommodate radial expansion of the bearing resulting from temperature rises due to high speed operation and axial movement of said cup due to such radial expansion. The invention also consists in providing the mounting sleeve with means for preventing the resilient portion thereof from being stressed beyond its elastic limit during the operation of the bearing and during the mounting and dismounting of said sleeve. The invention also consists in the bearing mounting and in the parts and combinations and arrangements of parts hereinafter described and claimed.

In the accompanying drawings, which form part of this specification and wherein like symbols refer to like parts wherever they occur:

Fig. 1 is a fragmentary sectional longitudinal view of a bearing mounting embodying my invention, Fig. 2 is a part side elevational and part longitudinal sectional view of the bearing supporting sleeve shown in Fig. 1, Fig. 3 is a transverse sectional view on line 3—3 in Fig. 2, Fig. 4 is a view similar to Fig. 1, showing a modified form of bearing mounting, Fig. 5 is a part side elevational and part longitudinal sectional view of the bearing supporting sleeve shown in Fig. 4, Fig. 6 is a transverse sectional view on the line 6—6 in Fig. 5; and Figs. 7 and 8 are fragmentary views similar to

2

Figs. 1 and 4, respectively, showing two modifications of the invention.

In the accompanying drawings, my invention is shown embodied in a high speed radial and end thrust roller bearing mounting comprising a housing 1 having a bore 2 therein, a shaft 3 extending axially through said bore and spaced therefrom and a single row taper roller bearing for supporting said shaft in said bore adjacent to one end thereof. The roller bearing preferably comprises a circular series of conical rollers 4 mounted in a suitable cage 5 and interposed between a cone or inner raceway member 6 having a thrust rib 6a at the large end thereof, and an internally tapered cup or outer raceway member 7.

The cone 6 is mounted on a reduced end portion 8 of the shaft 3 and is held thereon preferably by means of a ring nut 9 that is threaded on said shaft in abutting relation to the outer end of said cone, one or more annular shims 10 being clamped between the inner end of said cone and an annular shoulder 11 formed by the reduced cone supporting portion of the shaft to provide proper running clearance in the bearing. The end of the bore 2 of the housing 1 is closed by an annular closure plate 12 having a central opening for the ring nut 9.

The cup 7 of the taper roller bearing is supported in a cylindrical mounting sleeve comprising a relatively thick inner end portion 13, which is press-fitted in a counterbore 14 provided therefor in the end of the shaft receiving bore 2 of the housing 1 in endwise abutting relation to an annular shoulder 15 formed therein by said counterbore, and a relatively thin outer end portion 16 that is of smaller outside diameter than said inner end portion and is counterbored, as at 17, to receive said cup which is press-fitted therein in abutting relation to an annular shoulder 18 formed by said last mentioned counterbore. The portion of the mounting sleeve between its fixed relatively thick inner end portion 13 and its free relatively thin cup supporting portion 16 has two axially spaced circular series of circumferentially spaced circumferential slots 18a extending therethrough, the slots of one series being disposed opposite the spaces between and in overlapping relation to the ends of the slots of the other series. The mounting sleeve has a safety sleeve or ring 19 loosely mounted therein for limited sliding movement axially thereof between the cup 7 therein and a snap ring 20 mounted in an internal annular groove in said sleeve.

By the arrangement described the inner end portion 13 of the mounting sleeve is rigidly mounted in the shaft receiving bore 2 of the housing 1 and the outer cup supporting portion 16 of said sleeve is clear of said bore, while the slots 18a in the intermediate portion of said sleeve impart sufficient resiliency thereto to permit radial expansion of said outer end portion of said sleeve and the cup supported therein upon a rise in temperature due to the high rotational speed of the bearing. At the same time, the resiliency of the circumferential slotted portion of the sleeve also permits inward axial movement of the cup supporting outer end portion 16 thereof when the thrust load on the bearing equals the rated thrust capacity for the speed involved. This axial movement of the free cup supporting portion 16 of the mounting sleeve is limited by the safety ring 19 therein which serves as a stop for the cup 7 and thus prevents said sleeve from being stressed beyond its elastic limit during the mounting and dismounting thereof and during the operation of the bearing. With bearings that operate at minimum high speeds and minimum high temperatures rises resulting therefrom it may be desirable to omit the circumferential slots 18a in the mounting sleeve, such radial expansion and axial deflection of the cup supporting portion of the sleeve being permitted by the radial clearance between said portion of said sleeve and the bore of the housing.

In the construction shown in Figs. 4, 5 and 6, my invention is shown embodied in a high speed double row taper roller bearing comprising two axially spaced circular series of conical rollers 21, a separate cage 22 for each series of rollers, a separate cone or inner raceway member 23 for each series of rollers having a thrust rib 23a at its large end, and a double cup or outer raceway member 24 for the rollers of both series. The cones 26 are mounted on the reduced outer end portion of a shaft 27 with the inner end of the innermost cone in abutting relation to a shoulder 28 formed by a reduced portion 29 of said shaft and with a ring nut 30 threaded on said shaft in abutting relation to the outer end of the outermost cone. The housing 31 has a bore 32 therethrough adapted to receive the shaft 27 and the end of said bore is closed by means of an annular closure plate 32a suitably secured to the outer end of said housing.

The cup 24 is mounted in the bore of a mounting sleeve 33 and is held against axial movement therein by snap rings 34 mounted in grooves provided therefor in said bore at the ends of said cup. If desired, the snap rings 34 may be omitted and the cup 24 press-fitted in the mounting sleeve 33. The mounting sleeve 33 extends axially beyond opposite ends of the cup 24 therein and its ends 35 have a slip fit in the bore 32 of the housing 31. Between these slip-fitted ends 35, however, the outside diameter of the intermediate cup supporting portion of the mounting sleeve is smaller than the outside diameter of said ends, thereby providing an annular clearance space between said cup supporting portion of said sleeve and the bore 32 of the housing 31. The mounting sleeve is provided between each slip-fitted end 35 thereof and the cup supporting intermediate portion thereof with two circular series of circumferentially spaced holes 36 extending therethrough, the holes of one series being offset circumferentially with respect to the holes of the other series. By this arrangement, the intermediate cup supporting portion of the adaptor is adapted to expand radially with the cup to accommodate thermal expansion of the bearing under high speed operation and is adapted to shift axially with the cup in response to such radial expansion.

As shown in the drawings, the mounting sleeve 33 has an annular external peripheral groove 37 therein opposite each pair of circumferentially offset circular series of holes 36. Mounted in each of these annular grooves 37 is a safety ring or sleeve 38 of less width than the width of the groove, this safety ring serving as a stop to prevent overstressing of the resilient cup supporting portion of the mounting sleeve 33 in operation and when mounting and dismounting the cup, sleeve and installing or removing the safety ring assembly.

Obviously, the hereinbefore described arrangements admit of considerable modification without departing from the invention. For instance, the radial clearance between the cup supporting portion of the mounting sleeve and the bore of the housing may be obtained by enlarging the bore, as at 14a, in the manner shown in Fig. 7, instead of reducing the outside diameter of said sleeve; and likewise, as shown in Fig. 8, the annular clearance space between the double cup receiving portions of the supporting sleeve and the bore 32 of the housing 31 may be provided by enlarging said bore, as at 32b, opposite said cup receiving portion of said sleeve.

What I claim is:

1. A bearing mounting comprising relatively rotatable inner and outer members, a radial and thrust bearing interposed between said members, and a mounting sleeve for said bearing having a portion directly supported by one of said members, a portion entirely clear thereof and supporting said bearing, and a radially and axially resilient portion extending straight between said directly supported portion and said bearing supporting portion and adapted to accommodate diametric expansion and axial movement of said bearing supporting portion induced by the diametric expansion of said bearing due to temperature rises under high speed operation thereof.

2. A bearing mounting comprising relatively rotatable inner and outer members, a bearing interposed between said members, and a mounting sleeve for said bearing having a portion directly supported by one of said members, a portion entirely clear thereof and supporting said bearing, and a radially and axially resilient portion extending straight between said directly supported portion and said bearing supporting portion and adapted to accommodate diametric expansion and axial movement of said bearing supporting portion induced by the diametric expansion of said bearing due to temperature rises under high speed operation thereof, and means in said mounting sleeve for positively limiting such axial movement of said bearing supporting portion thereof.

3. A bearing mounting comprising relatively rotatable inner and outer members, a rotary antifriction bearing interposed between said members, and a mounting sleeve for said bearing having a portion fixed to said outer member, a portion entirely free thereof and supporting said bearing, and a radially and axially resilient portion extending straight between said fixed portion and said free bearing supporting portion and adapted to accommodate diametric expan- 4. A bearing mounting comprising relatively rotatable inner and outer members, a rotary antifriction bearing interposed between said members, and a mounting sleeve for said bearing having a portion fixed to said outer member, a portion entirely free thereof and supporting said bearing, and a radially and axially resilient portion extending straight between said fixed portion and said free bearing supporting portion and adapted to accommodate diametric expansion and axial movement of said bearing supporting portion induced by the diametric expansion of said bearing due to temperature rises under high speed operation thereof.

5. A bearing mounting comprising relatively rotatable inner and outer members, a rotary antifriction radial and thrust bearing interposed between said members, and a mounting sleeve for said bearing having a portion fixed to said outer member, a portion entirely free thereof and supporting said bearing, and a radially and axially resilient portion extending straight between said fixed portion and said free bearing supporting portion and adapted to accommodate diametric expansion and axial movement of said bearing supporting portion induced by the diametric expansion of said bearing due to temperature rises under high speed operation thereof and means in said mounting sleeve for positively limiting the axial movement of the bearing supporting portion thereof.

6. A bearing mounting comprising relatively rotatable inner and outer members, a rotary antifriction radial and thrust bearing interposed between said members, and a mounting sleeve for said bearing having a portion rigidly supported by one of said members and a portion free thereof and supporting said bearing, said mounting sleeve having a circular series of openings extending therethrough between the rigidly supported and free portions thereof, whereby said free portion is radially expansible to accommodate diametric expansion of the bearing due to temperature rises under high speed operation thereof and is axially movable to permit axial movement of said bearing induced by the radial expansion thereof.

7. A bearing mounting comprising relatively rotatable inner and outer members, a rotary antifriction radial and thrust bearing interposed between said members, and a mounting sleeve for said bearing having a portion rigidly supported by one of said members and a portion free thereof and supporting said bearing, said mounting sleeve having a circular series of openings extending therethrough between the rigidly supported and free portions thereof, whereby said free portion is radially expansible to accommodate diametric expansion of the bearing due to temperature rises under high speed operation thereof and is axially movable to permit axial movement of said bearing induced by the radial expansion thereof, and means in said sleeve for limiting the axial movement of the free bearing supporting portion thereof.

8. A bearing mounting comprising relatively rotatable inner and outer members, a mounting sleeve having a portion rigidly supported in said outer member, a portion free thereof, and a taper roller bearing including an inner raceway mounted on said inner member, an outer raceway fixed in the free portion of said sleeve, and conical rollers interposed between said raceways, said sleeve including a radially and axially resilient portion extending straight between said rigidly supported portion and said free bearing supporting portion and adapted to accommodate diametric expansion and axial movement of said bearing supporting portion induced by the diametric expansion of said bearing due to temperature rises under high speed operation thereof.

9. A bearing mounting comprising relatively rotatable inner and outer members, a mounting sleeve having a portion rigidly supported in said outer member, a portion free thereof, and a taper roller bearing including an inner raceway mounted on said inner member, an outer raceway fixed in the free portion of said sleeve, and conical rollers interposed between said raceways, said sleeve including a radially and axially resilient portion extending straight between said rigidly supported portion and said free bearing supporting portion and adapted to accommodate diametric expansion and axial movement of said bearing supporting portion induced by the diametric expansion of said bearing due to temperature rises under high speed operation thereof, and a rigid stop ring mounted in said sleeve for limiting the axial movement of the free outer raceway portion thereof.

10. A bearing mounting comprising relatively rotatable inner and outer members, a mounting sleeve having one end portion press fitted in said outer member and the other end portion free thereof, and a taper roller bearing including an inner raceway mounted on said inner member, an outer raceway mounted tight in the free end portion of said sleeve, and conical rollers interposed between said inner and outer raceways, said sleeve having a circular series of openings therethrough between said end portions thereof, whereby the free portion of said sleeve is expansible to accommodate diametric expansion of the bearing due to temperature rises under high speed operation thereof and is axially movable to permit axial movement of said outer raceway induced by the radial expansion of said inner raceway.

11. A bearing mounting comprising relatively rotatable inner and outer members, a mounting sleeve having one end portion press fitted in said outer member and the other end portion free thereof, and a taper roller bearing including an inner raceway mounted on said inner member, an outer raceway mounted tight in the free end portion of said sleeve, and conical rollers interposed between said inner and outer raceways, said sleeve having a circular series of openings therethrough between said end portions thereof, whereby the free portion of said sleeve is expansible to accommodate diametric expansion of the inner raceway due to temperature rises under high speed operation thereof and is axially movable to permit axial movement of said outer raceway induced by the radial expansion of said inner raceway, and a stop ring mounted in said sleeve and engaged by said outer raceway for limiting the axial movement of the free end portion of said sleeve.

12. A bearing mounting comprising relatively rotatable inner and outer members, a mounting sleeve having its end portions supported in said outer member and its intermediate portion clear thereof, and a double taper roller bearing including two axially spaced series of conical rollers, a separate inner raceway for each series of rollers mounted on said inner member and an outer raceway for both series of rollers mounted in the intermediate portion of said sleeve, said sleeve having a circular series of openings therethrough between the end and intermediate portions thereof, whereby the intermediate portion of said sleeve is expansible to accommodate diametric expansion of the bearing due to temperature rises under high speed operation thereof and is axially movable relative to said end portions to permit axial movement of said outer raceway induced by the radial expansion of said inner raceways.

13. A bearing mounting comprising relatively rotatable inner and outer members, a mounting sleeve having its end portions supported in said outer member against axial movement therein and its intermediate portion spaced radially inwardly clear thereof, and a double taper roller bearing including two axially spaced series of conical rollers, a separate inner raceway for each series of rollers mounted on said inner member and an outer raceway for both series of rollers mounted in the intermediate portion of said sleeve against axial movement relative thereto, said sleeve having circular series of openings therethrough between the end and intermediate portions thereof, whereby the intermediate portion of said sleeve is expansible to accommodate diametric expansion of the bearing due to temperature rises under high speed operation thereof and is axially movable relative to said end portions to permit axial movement of said outer raceway induced by the radial expansion of said inner raceways, and stop rings mounted in said sleeve between the end and intermediate portions thereof for limiting the axial movement of said intermediate portion of said sleeve.

14. A bearing mounting comprising relatively rotatable inner and outer members, a bearing interposed between said members, and a mounting sleeve for said bearing having a portion rigidly supported by one of said members and a portion free thereof and supporting said bearing, said mounting sleeve having a circular series of openings extending therethrough between the rigidly supported and free portions thereof, whereby said free portion is radially expansible to accommodate diametric expansion of the bearing due to temperature rises under high speed operation thereof and is axially movable to permit axial movement of said bearing induced by the radial expansion thereof.

ERNEST G. BODEN.

REFERENCES CITED

The following references are of record in the file of this patent:

UNITED STATES PATENTS

| Number | Name | Date |
|---|---|---|
| 1,639,684 | Bott | Aug. 23, 1927 |
| 1,965,293 | Ljungstrom | July 3, 1934 |
| 2,119,990 | Hilton | June 7, 1938 |
| 2,314,622 | Klamp | Mar. 23, 1943 |

FOREIGN PATENTS

| Number | Country | Date |
|---|---|---|
| 29,441 | Sweden | Sept. 3, 1910 |
| 315,352 | Great Britain | May 28, 1929 |